(12) United States Patent
Wolfe et al.

(10) Patent No.: US 7,536,864 B2
(45) Date of Patent: May 26, 2009

(54) VARIABLE MOTIVE NOZZLE EJECTOR FOR USE WITH TURBINE ENGINES

(75) Inventors: Christopher E. Wolfe, Niskayuna, NY (US); Douglas F. Beadie, Greer, SC (US); Kenneth N. Whaling, Simpsonville, SC (US); David W. Ball, Easley, SC (US); Kevin T. McGovern, Simpsonville, SC (US); Ravi Praveen Eluripati, Greenville, SC (US); Omprakash Samudrala, Clifton, NY (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 11/164,836

(22) Filed: Dec. 7, 2005

(65) Prior Publication Data
US 2007/0125092 A1 Jun. 7, 2007

(51) Int. Cl.
*F02C 6/08* (2006.01)
*F02C 6/04* (2006.01)
*F02C 7/12* (2006.01)

(52) U.S. Cl. .............. 60/782; 60/785; 60/806

(58) Field of Classification Search ............ 60/782, 60/785, 806, 262
See application file for complete search history.

(56) References Cited

U.S. PATENT DOCUMENTS

| | | | | |
|---|---|---|---|---|
| 3,441,045 | A | * | 4/1969 | Malone ............. 137/114 |
| 4,631,004 | A | * | 12/1986 | Mock ............... 417/189 |
| 6,412,270 | B1 | * | 7/2002 | Mortzheim et al. ....... 60/782 |
| 6,550,253 | B2 | | 4/2003 | Mortzheim et al. ....... 60/782 |
| 6,615,574 | B1 | | 9/2003 | Marks ............. 60/39.02 |
| 6,701,715 | B2 | * | 3/2004 | Anderson et al. ........ 60/782 |

* cited by examiner

*Primary Examiner*—Michael Cuff
*Assistant Examiner*—Gerald L Sung
(74) *Attorney, Agent, or Firm*—Sutherland Asbill & Brennan LLP

(57) ABSTRACT

A gas turbine engine system. The system includes a compressor with a first compressor stage and a second compressor stage, a turbine with a first turbine stage and a second turbine stage, a first flow path connecting the first compressor stage and the first turbine stage, a second flow path connecting the second compressor stage and the second turbine stage, a crossover flow path connecting the first flow path and the second flow path, and an ejector positioned about the crossover flow path and the first flow path. The ejector may be a variable motive nozzle ejector.

9 Claims, 2 Drawing Sheets

VARIABLE MOTIVE NOZZLE EJECTOR FOR USE WITH TURBINE ENGINES

DESCRIPTION

1. Technical Field

The present invention relates generally to turbine engines and more particularly relates to the use of a variable motive nozzle ejector for optimizing the combination of compressor bleeds in turbine engines.

2. Background of the Invention

In gas turbine engines, a portion of the total airflow from the compressor inlet is diverted to cool various turbine components. The diverted air, however, may consume a large portion of the total airflow through the compressor. The management and control of these parasitic flows therefore may increase the overall performance of the turbine engine.

Typically, air is extracted under pressure from the compressor for use as a cooling flow for the various turbine components and thus bypasses the combustion system. Ejectors are often useful for this purpose. For example, bleed air may be extracted from a thirteenth stage of the compressor to cool a second stage nozzle of the turbine. Bleed air also may be extracted from another stage, for example, a ninth stage, at a lower pressure and temperature from that extracted from the thirteenth stage for supplying cooling air to a third stage nozzle of the turbine. The extraction ports, however, often provide cooling airflow at too high a pressure and/or temperature. The flow thus may be throttled and result in a net loss of energy. By employing an ejector, the low pressure/temperature airflow may be mixed with the high pressure/temperature airflow to provide an airflow at an intermediate pressure and temperature substantially matching the pressure and temperature required to cool the turbine stage, while simultaneously making use of the low pressure and temperature airflow that otherwise might be dissipated as wasted energy.

As is known, an ejector generally does not have any moving parts. The ejector is sized to provide the required air at ISO conditions. Daily temperature variations, however, will have an impact on the operational characteristics of the ejector. In other words, the ejector will behave differently on different days and at different times during each day. On hot days, the ejector will deliver more air than required and may overflow. Such an overflow may not impact the lifetime of the ejector, but the performance benefits may suffer. On cold days, the ejector may not deliver enough air and a bypass line may be used.

There is a desire, therefore, for an ejector system that can accommodate daily variations in ambient conditions. Such a system preferably will increase the overall efficiency of the turbine engine.

SUMMARY OF THE INVENTION

The present application thus describes a gas turbine engine system. The system includes a compressor with a first compressor stage and a second compressor stage, a turbine with a first turbine stage and a second turbine stage, a first flow path connecting the first compressor stage and the first turbine stage, a second flow path connecting the second compressor stage and the second turbine stage, a crossover flow path connecting the first flow path and the second flow path, and an ejector positioned about the crossover flow path and the first flow path. The ejector may be a variable motive nozzle ejector.

The first compressor stage may include a thirteenth stage and the second compressor stage may include a ninth stage. The first turbine stage may include a second stage nozzle and the second turbine stage may include a third stage nozzle. The ejector may include a ram positioned within a primary nozzle. An actuator may be in communication the ram. The system further may include a pressure sensor in communication with the first turbine stage and the ejector. A number of pressure sensors may be used.

The present application further describes a method of maximizing compressor bleeds in turbine system having a compressor, a turbine, and a variable motive nozzle ejector. The method may include flowing a first airflow from the compressor to the turbine, flowing a second airflow from the compressor to the turbine, mixing the first airflow with a portion of the second airflow in the ejector to form a third airflow, sensing the pressure of the third airflow, and adjusting the variable motive nozzle ejector based upon the sensed pressure. The variable motive nozzle ejector increases the third airflow therethrough based upon a sensed low pressure and decreases the third airflow therethrough based upon a sensed high pressure.

The present application further describes a gas turbine engine system having a compressor with a number of compressor stages and a turbine with a number of turbine stages. The system may include a first flow path connecting a first one of the compressor stages and a first one of the turbine stages, a pressure sensor positioned about the first flow path, a second flow path connecting a second one of the second compressor stages and a second one of the turbine stages, a crossover flow path connecting the first flow path and the second flow path, and an adjustable ejector positioned about the crossover flow path and the first flow path and in communication with the pressure sensor. The adjustable ejector may include a variable motive nozzle ejector. The adjustable ejector may include a ram positioned within a primary nozzle and an actuator in communication with the ram.

These and other features of the present application will become apparent to one of ordinary skill in the art upon review of the following detailed description when taken in conjunction with the drawings and the appended claims.

DETAILED DESCRIPTION

Figure 1:
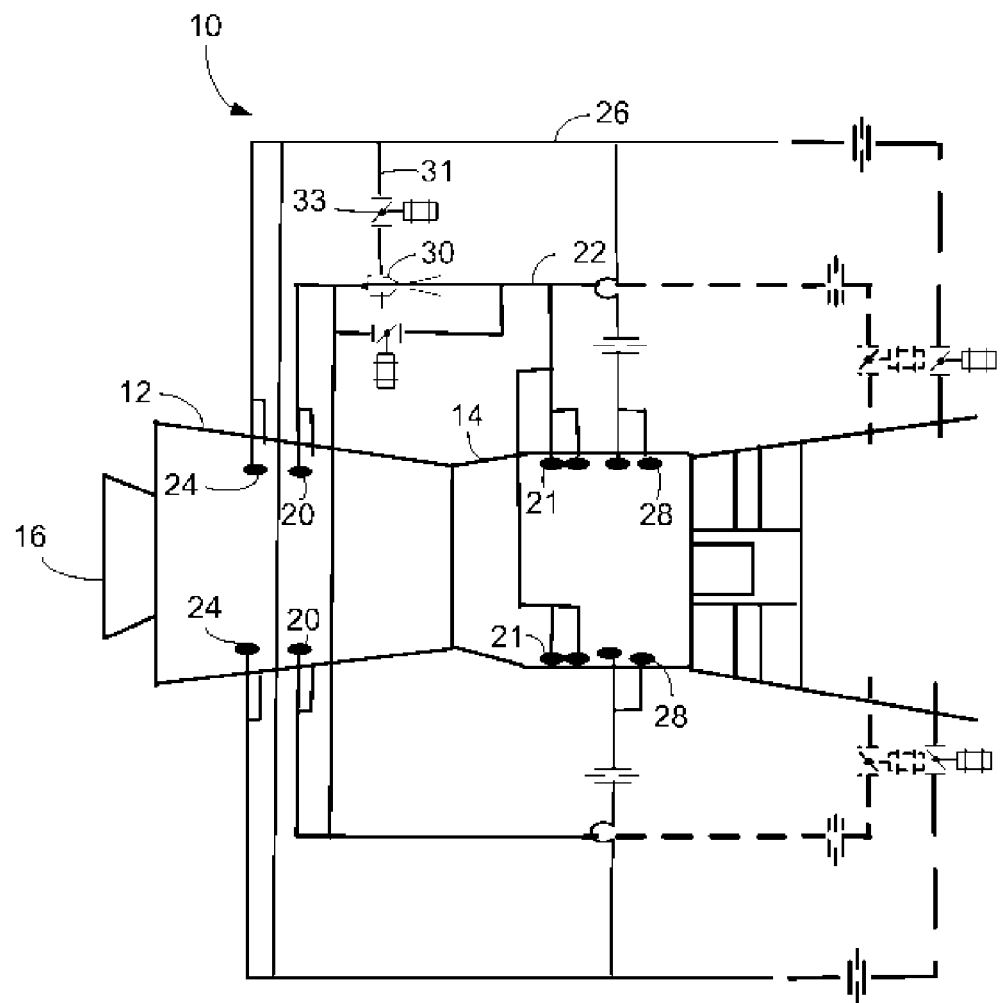
FIG. 1 is a schematic illustration of the compressor and turbine sections of a turbine engine with a known ejector.

Referring now to the drawings, in which like numerals refer to like elements throughout the several views, FIG. 1 shows a turbine engine system 10. The system 10 includes a compressor 12 and a turbine 14. The compressor 12 has an inlet 16 for receiving ambient air. The air is then compressed through a number of different compressor stages. Each stage compresses the air to higher pressures and temperatures. Most of the compressed air is delivered to a combustor. The compressor combines the pressurized air with fuel for combustion. The hot combustion gases are then provided to the various stages of the turbine 14. Bleed air typically also is removed from various stages of the compressors 12 for use as a cooling or a purge airflow in the turbine 14 and for other purposes.

By way of example, a high pressure air extraction may be taken from a thirteenth stage 20 of the compressor 12 and provided as a cooling airflow to a second stage nozzle 21 of the turbine 14 via a flow path 22. As is shown, multiple flow paths may be used. Similarly, bleed air also may be extracted from an earlier stage, for example a ninth stage 24 of the compressor 12, and supplied via a flow path 26 as cooling air to a third stage nozzle 28. A bypass flow path 32 may be in communication with the flow path 22. The bypass flow path 32 may include a throttling valve 29. As will be described in more detail below, the bypass flow path 32 may provide further airflow on cold days. A number of crossover lines also may be used.

An ejector 30 may be positioned in the flow path 22. As described above, the ejector 30 eliminates the need to dissipate bleed air pressures. The ejector 30 also enables mixing of the bleed air from the flow paths 22, 26 so as to adjust the extraction flows to optimize the efficiency of the overall system 10. A crossover flow path 31 may be positioned between the flow paths 22, 26. The crossover flow path 31 may include an isolation valve 33. The isolation valve 33 may isolate the ejector 30 when ambient conditions are not favorable.

Figure 2:
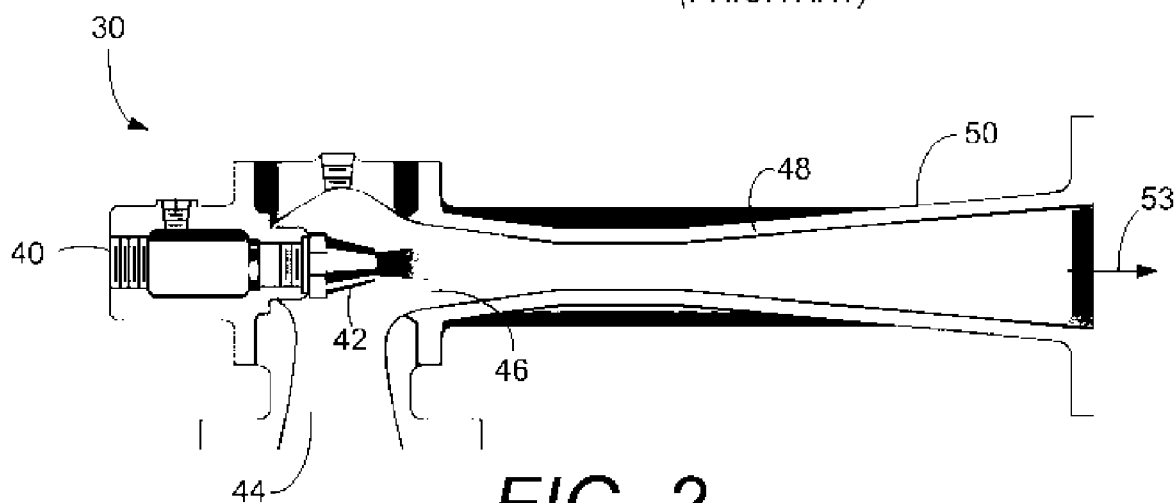
FIG. 2 is a side cross-sectional view of a known ejector.

A known ejector 30 is shown in FIG. 2. The ejector 30 is a mechanical device with no moving parts that mixes two fluid streams based on a momentum transfer. Because the ejector 30 has no moving parts, it is designed to operate at a specific design point based on ISO day conditions. The ejector 30 has an air inlet 40 for the high pressure motive fluid received via the flow path 22, a primary nozzle 42 to lower the static pressure for the motive flow to a pressure below the total pressure of the suction pressure, an inlet 44 for the low pressure or suction fluid received via the crossover flow path 31, a secondary nozzle 46 for accelerating the secondary flow to drop its static pressure, a mixing tube 48 for mixing the two flows, and a diffuser 50 for decelerating the mixed flow and regain static pressure. Known ejector systems are shown in commonly owned U.S. Pat. Nos. 6,550,253 and 6,615,574, incorporated herein by reference.

By locating the ejector 30 in the flow path 22, the high-pressure extraction flow from the thirteenth stage 20 of the compressor 12 serves as the motive flow at the inlet 40 of the ejector 30. The lower pressure, low temperature flow via the flow path 26 flows to the ejector 30 via a crossover flow path 31 and serves as the suction flow via the inlet 44. Thus, the two flows are mixed together and flow through the diffuser 50 of the ejector 30. The two flows thus form a third flow 53 at a pressure and a temperature intermediate of the pressure and temperature of the respective motive and suction flows.

Figure 3:
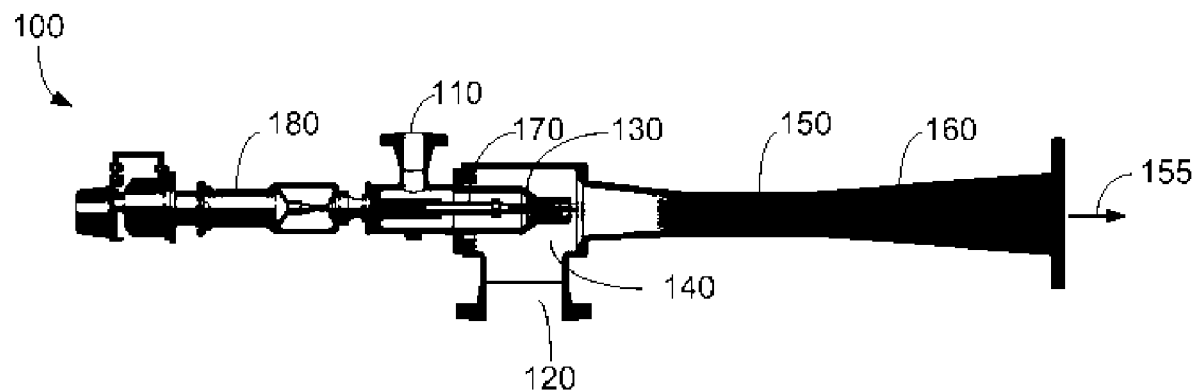
FIG. 3 is a side cross-sectional view of a variable motive nozzle ejector as is described herein.

FIG. 3 shows a variable motive nozzle ejector 100 as is described herein. As is shown, the ejector 100 has a motive inlet 110 for the high pressure motive fluid received via the flow path 22, a suction inlet 120 for the low pressure suction fluid received via the crossover flow path 31, a primary nozzle 130, a secondary nozzle 140, a mixing tube 150 for mixing two flows to create a third airflow 155, and a diffuser 160 for decelerating the mixed flow and regaining static pressure.

The ejector 100 further includes a ram 170 positioned within the primary nozzle 130. An actuator 180 may operate the ram 170. The actuator 180 maneuvers the ram 170 within the primary nozzle 130 so as to change the area of the primary nozzle 130 according to current ambient conditions. An example of the variable motive nozzle ejector 100 may be sold by Graham Corporation of Batavia, N.Y.

Figure 4:
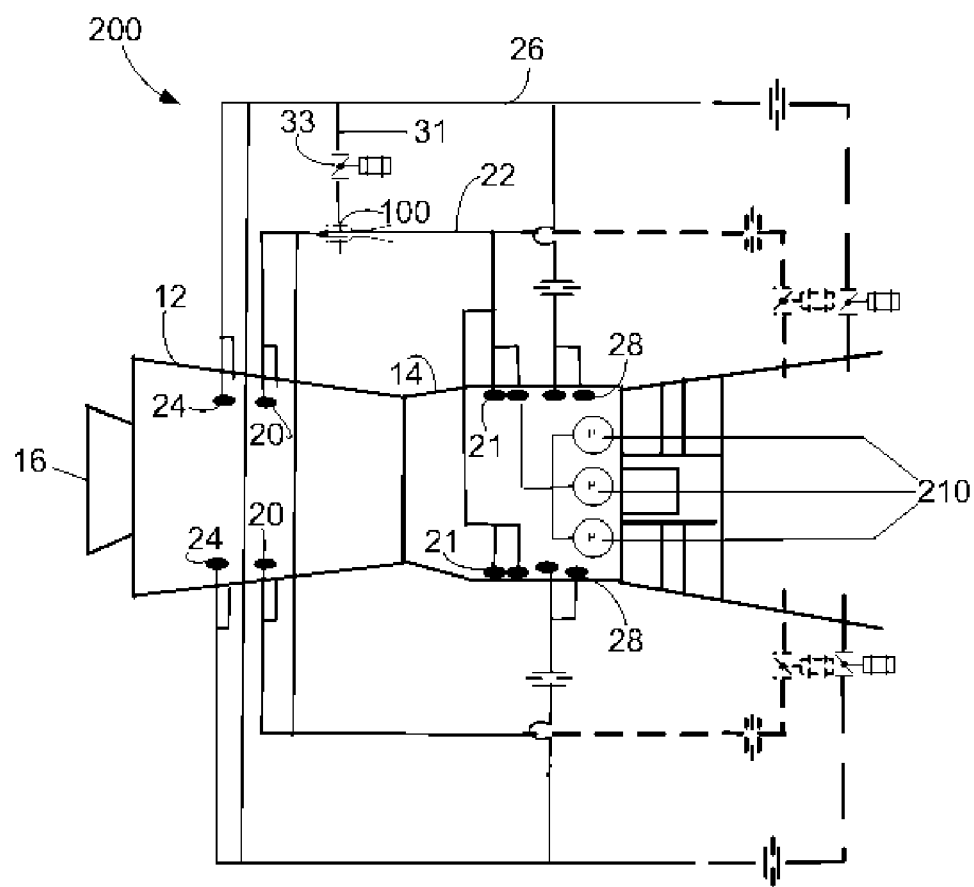
FIG. 4 is a schematic illustration of the compressor and turbine sections of a turbine engine employing the variable motive nozzle ejector of the FIG. 3.

FIG. 4 shows a turbine engine system 200 as is described herein. The system 200 includes the use of the ejector 100 and the removal of the bypass flow path 32 and the throttling valve 29. Instead of using the bypass flow path 32, the actuator 180 of the ejector can withdraw the ram 170 so as to enlarge the area of the primary nozzle 130 and thus increase the airflow therethrough.

The ejector 100 may be in communication with a number of pressure sensors 210. The pressure sensors 210 may be positioned about the stage two nozzle 21 of the turbine 14 so as to detect changes in the pressure therein. The ejector 100 and the pressure sensors 210 may be in communication with a conventional microprocessor and/or other type of control device. The control device may initiate operation of the actuator 180 based upon the signals received from the sensors 190. A conventional lookup table or similar types of control means may be used herein. The ejector 100 also may take the ambient temperature directly in consideration.

The ejector 100 thus provides optimum performance across the ambient range as opposed to being optimized for a single operating temperature. The ejector 100 therefore may provide the desired extraction flow so as to maximize the entrainment ratio (low pressure extraction air as a portion of the high pressure air). The complexity of the overall system 200 likewise is reduced with the elimination of the bypass flow path 32 and the throttling valve 29.

It should be apparent that the foregoing relates only to the preferred embodiments of the present application and that numerous changes and modifications may be made herein without departing from the general spirit and scope of the invention as defined by the following claims and the equivalents thereof.

What is claimed is:

1. A gas turbine engine system, comprising:
   a compressor section;
   the compressor section comprising a first compressor stage and a second compressor stage;
   a turbine section;
   the turbine section comprising a first turbine stage and a second turbine stage;
   one or more pressure sensors located within the turbine section;
   a first flow path connecting the first compressor stage and the first turbine stage;
   a second flow path connecting the second compressor stage and the second turbine stage;
   a crossover flow path connecting the first flow path and the second flow path; and
   an ejector positioned about the crossover flow path and the first flow path;
   the ejector comprising a mechanically variable motive nozzle ejector with a movable ram positioned therein operable by an actuator in communication with the one or more pressure sensors;
   wherein the actuator varies the position of the movable ram based upon a sensed pressure.

2. The system of claim 1, wherein the first compressor stage comprises a thirteenth stage.

3. The system of claim 1, wherein the second compressor stage comprises a ninth stage.

4. The system of claim 1, wherein the first turbine stage comprises a second stage nozzle.

5. The system of claim 1, wherein the second turbine stage comprises a third stage nozzle.

6. The system of claim 1, wherein the ram is positioned within a primary nozzle.

7. A method of maximizing compressor bleeds in a gas turbine system having a compressor section, a turbine section, and a mechanically variable motive nozzle ejector with a ram therein, comprising:

flowing a first airflow from the compressor section to the ejector;

flowing a second airflow from the compressor section to the ejector;

mixing the first airflow with a portion of the second airflow in the ejector to form a third airflow flowing the third airflow from the ejector to the turbine section;

sensing the pressure of the third airflow at the turbine; and adjusting the variable motive nozzle ejector based upon the sensed pressure by moving the ram therein.

8. The method of claim 7, wherein the variable motive nozzle ejector increases the third airflow therethrough based upon a sensed low pressure.

9. The method of claim 7, wherein the variable motive nozzle ejector decreases the third airflow therethrough based upon a sensed high pressure.

* * * * *